3,047,519
PROCESS FOR PREPARING A RUBBER COMPOSITION CONTAINING A CROSS-LINKED POLYMER OF A MONOVINYL AROMATIC COMPOUND
Stanley Maurice Ardley, Penarth, Glamorgan, Wales, assignor to The Distillers Company Limited, Edinburgh, Scotland, a British company
No Drawing. Filed Apr. 8, 1955, Ser. No. 500,274
Claims priority, application Great Britain May 7, 1954
1 Claim. (Cl. 260—5)

The present invention relates to rubber/polystyrene compositions and methods for their production.

It is well known that rubber-like compositions having improved hardness and modulus coefficients as compared with pure rubber may be obtained by incorporating in the pure rubber small proportions of polystyrene before vulcanisation of the mixture. However, these improvements are gained at the expense of the tensile strength and flex cracking resistance.

The object of the present invention is to produce rubber-like compositions from natural rubber and modified polystyrene polymers which have all the attributes usually associated with rubber/polystyrene compositions and which in addition have improved tensile properties and flex resistance as compared with known rubber/polystyrene compositions.

It has now been found that such improved rubber-like compositions are obtained by incorporating in the rubber before vulcanisation a cross-linked polystyrene-type polymer with which the rubber shows a quite unexpectedly high degree of compatibility.

The present invention, therefore, comprises vulcanised rubber-like compositions containing natural rubber and a cross-linked mono-vinyl aromatic compound polymer and methods for, and intermediate compositions in, the production of such rubber-like compositions.

The rubber is conveniently used in any of its commercially available forms, such as crepe, smoked sheet and the like.

By the term "cross-linked mono-vinyl aromatic compound polymer" is meant throughout this specification the polymerised product obtained by carrying out the polymerisation of a mono-vinyl aromatic compound in the presence therein of a small proportion of a copolymerisable cross-linking agent. The most suitable mono-vinyl aromatic compound is styrene itself but its lower alkyl-(not more than 4 carbon atoms) substituted derivatives such as the vinyl toluenes and the ethyl styrenes may be employed. Mixtures of such styrene-type compounds may be used in the preparation of the cross-linked mono-vinyl aromatic compound polymer used in the compositions of the present invention.

The copolymerisable cross-linking agents used in the preparation of the cross-linked polymer contain at least two and not more than three polymerisable ethylenic double bonds in their monomeric molecular structure, said double bonds not forming part of a non-cyclic conjugated carbon chain and being capable of undergoing addition copolymerisation with the mono-vinyl aromatic compound. Such agents are well-known in the art and may be used alone or in mixtures. Examples are the ethylenically unsaturated derivatives of cyclic compounds such as the di-vinyl or tri-vinyl benzenes, naphthalenes, anthracenes, phenanthrenes, carbazoles, pyridines and the like. Similar examples are the di-isopropenyl benzenes, naphthalenes and the like. A different type of cross-linking agent are ethers and esters containing at least two ethylenically unsaturated groups. Examples of such agents are the allyl and vinyl esters of polycarboxylic acids such as phthalic, succinic or oxalic acids and of unsaturated acids such as maleic, fumaric, itaconic, citraconic, acrylic or methacrylic acids. Further examples are the esters of polyhydric alcohols with unsaturated acids, for example the di-acrylates or methacrylates derived from glycols such as the ethylene, propylene, butylene, di-ethylene or di-propylene glycols.

The proportion of cross-linking agent employed may be varied considerably depending on the mono-vinyl aromatic compound monomer and cross-linking agent employed. It is important that only a minor proportion of the cross-linking agent should be used compared with the monomeric mono-vinyl aromatic compound employed and most suitably an amount of cross-linking agent in the range 1–5% by weight on the monomer is used. With most cross-linking agents it is usually found that a definite proportion of agent within this range give vulcanised compositions according to the present invention having optimum properties.

The most useful vulcanised compositions according to the present invention contain a major proportion of rubber in the final composition and they may be prepared by mixing the various components together in any suitable way. However, in such mixing procedures the mixture tends to become heated and, if it contains a vulcanising agent, premature vulcanisation may occur. Furthermore, if all the rubber in the final composition is mixed in one batch with the cross-linked mono-vinyl aromatic compound polymer, the whole of the rubber becomes heated by the mixing process and thus such a process is wasteful and may, in fact, lead to inferior products.

It is, therefore, preferred to prepare the vulcanised compositions of the present invention by first mixing the cross-linked mono-vinyl aromatic compound polymer with a minor proportion of the natural rubber until a homogeneous product results. Such an initial composition may most suitable contain one part of rubber to 1–3 parts of the cross-linked polymer. The dispersion of the polymer in the rubber may be aided by adding plasticisers or solvents which are subsequently removed at a later stage. Most suitably an ester plasticiser such as di-butyl phthalate, di-octyl phthalate or tricresyl phosphate is employed in a proportion from 5 to 25 parts of plasticiser to 100 parts of cross-linked polymer.

Most suitably, the initial mixing of the cross-linked mono-vinyl aromatic compound polymer with the natural rubber is carried out at about 150° C. Below this temperature there is reduced compatibility with the rubber and at higher temperatures no improvement in compatibility occurs and there is the increased risk of deterioration of the rubber occurring.

This initially prepared cross-linked mono-vinyl aromatic compound polymer/rubber composition is, as stated, homogeneous and may be used as a reinforcing material, e.g., by admixture with further quantities or rubber in any desired proportions and at the same time any of the usual compounding ingredients and vulcanising agents may be added.

The compounding of the various mixes prepared in the production of the vulcanised rubber-like compositions of the present invention may be carried out by any of the well-known techniques employed in the rubber industry. Most suitably the mixing is performed on open rolls or in a Banbury mixer.

The vulcanisation of the final composition containing the rubber and the cross-linked polymer may be carried out under any of the conditions usually employed for the vulcanisation of rubber using known vulcanising agents such as sulphur, in conjunction with any of the usual accelerators, promoters and the like such as piperidine pentamethylene di-thiocarbamate, mercapto-benzothiazole, zinc diethyl dithiocarbamate, cyclohexyl benzthiazyl sulphenamide, zinc oxide, zinc isopropyl xanthate, tetramethyl thiuram disulphide, and diphenyl-guanidine, or mixtures of these agents.

As stated above, the vulcanized compositions according to the present invention should contain a greater proportion of rubber than cross-linked polymer if the composition is to have the properties associated with vulcanised rubber. In practice it is preferred that the proportion of cross-linked polymer to natural rubber in the vulcanised composition should lie within the range of 5 parts–25 parts of polymer to 100 parts of rubber although useful compositions for many purposes may be obtained outside this range. It is found that as the proportion of cross-linked polymer is increased the tensile strength of the resultant vulcanised product increases to a maximum value and that, at all proportions, the tensile strength of the vulcanised product is greatly superior to a similar vulcanised composition containing pure polystyrene as the reinforcing agent. The tensile strength values of the vulcanised rubber compositions of the present invention are in fact comparable with and often superior to the tensile strength values of rubbers reinforced with high styrene-butadiene copolymers. The modulus and flex characteristics of the resultant vulcanised products are also greatly improved while all the attributes of simple polystyrene/rubber compositions are retained.

The following examples illustrate the preparation and properties of vulcanised rubber-like compositions according to the present invention. In all the examples the rubber and the cross-linked mono-vinyl aromatic compound polymer are initially mixed to give intermediate homogeneous compositions containing a major proportion of the cross-linked polymer which are then further admixed with rubber and the necessary compounding ingredients. The parts given are by weight. All tests on the physical properties of the compositions were carried out as described in British Standard Specification 903, published 1950, and entitled: "Methods of Testing Vulcanised Rubber"—the tensile strength values being determined according to Section 15.3, type B (dumbbells), the hardness values according to Section 19.2, the tear strength according to Section 25 and the flex cracking resistance according to Section 26.2.

Examples 1 to 5

| | Parts |
|---|---|
| Pale crepe rubber | 100 |
| Styrene polymerised in the presence of 2% di-vinyl benzene | 200 |

The rubber was masticated for 3 minutes on a 12" two-roll mill at a temperature of 35–40° C. The cross-linked polymer in the form of a free-flowing powder was added to the rubber on the mill and blended. Heat was applied to the rolls and when the temperature reached 150° C. the cross-linked polymer appeared to break down and react with the rubber. For comparison a similar composition was prepared in the same manner by replacing the cross-linked polymer with 200 parts of polystyrene and 10 parts of dibutyl phthalate.

These products were then compounded with new rubber in the proportions shown in the following table and for every 100 parts of rubber hydrocarbon the following compounding ingredients were added: zinc oxide 5 parts, sulphur 3 parts, stearic acid 2 parts and cyclohexyl benzthiazyl sulphenamide 1 part. The cross-linked polystyrene/rubber blend more readily dispersed in the rubber than did the polystyrene/rubber comparison sample and the vulcanised products which were obtained by heating the mixtures at 141° C. for 18 minutes had superior overall properties as shown in the table.

| Example | | 1 | | 2 | | 3 | | 4 | | 5 | |
|---|---|---|---|---|---|---|---|---|---|---|---|
| Rubber | 100 | 90 | | 80 | | 70 | | 60 | | 50 | |
| Rubber polystyrene | | 10 | | 20 | | 30 | | 40 | | 50 | |
| Rubber-cross-linked polystyrene | | | 10 | | 20 | | 30 | | 40 | | 50 |
| Tensile strength, lbs./sq. in. | 3,750 | 3,200 | 3,800 | 3,070 | 4,000 | 2,640 | 3,860 | 1,920 | 2,980 | 1,080 | 1,910 |
| Elongation at break | 655 | 580 | 670 | 540 | 640 | 540 | 640 | 550 | 530 | 500 | 460 |
| Modulus at 300% | 315 | 540 | 432 | 670 | 630 | 740 | 675 | 610 | 1,030 | 590 | 1,060 |
| Hardness, B.S.° | 43 | 48 | 48 | 53 | 52 | 61 | 60 | 67 | 78 | 89 | 91 |
| Flex cracking resistance | 2.53 | 2.15 | 2.7 | 2.11 | 2.55 | 1.8 | 1.91 | 0.94 | 1.21 | 0.15 | 0.82 |

For comparison with Example 4 two vulcanised compositions were prepared by milling two high styrene/butadiene resins (A and B) with rubber and other ingredients as shown below under the conditions described in connection with Examples 1 to 5.

| | Parts |
|---|---|
| Pale crepe rubber | 60 |
| Resin | 40 |
| Zinc oxide | 3 |
| Sulphur | 1.8 |
| Stearic acid | 1.2 |
| Cyclohexyl benzthiazyl sulphenamide | 1 |

The properties of the resultant products are shown below in comparison with the product of Example 4, from which it will be seen that the composition according to the present invention has superior tensile strength, tear strength and elongation at break while having approximately the same modulus, hardness and flex cracking resistance.

| | High Styrene Resin A | High Styrene Resin B | Styrene/ DVB |
|---|---|---|---|
| Tensile strength (lbs./sq. in.) | 2,150 | 2,800 | 3,100 |
| Elongation (percent) | 385 | 520 | 530 |
| Modulus @ 300% | 1,800 | 1,100 | 1,030 |
| Hardness, B.S.° | 83 | 63 | 78 |
| Flex-cracking resistance | 1.10 | 2.4 | 1.24 |
| Tear strength (lbs./sq. in.) | 550 | 339 | 1,220 |

Examples 6 to 9

Four cross-linked polymers were prepared from styrene and divinylbenzene (DVB) using different levels of DVB. Each polymer was milled with rubber as described in Example 1, and subsequently compounded using the following formula:

| | Parts |
|---|---|
| Pale crepe rubber | 60 |
| Copolymer/rubber product | 40 |
| Zinc oxide | 3.65 |
| Sulphur | 2.2 |
| Stearic acid | 1.42 |
| C.B.S. | 0.73 |

| Example | | 6 | 7 | 8 | 9 |
|---|---|---|---|---|---|
| Percent DVB in polymer | | 0 | 0.05 | 1 | 2 | 4 |
| Tensile strength | 1,920 | 1,880 | 2,650 | 2,660 | 2,340 |
| Elongation | 550 | 460 | 620 | 520 | 530 |
| Modulus @ 300% | 610 | 1,090 | 1,160 | 930 | 653 |
| Hardness | 75 | 82 | 76 | 72 | 67 |
| Flexing | 0.94 | 0.95 | 1.21 | 1.24 | 1.18 |

Examples 10 to 14

A cross-linked mono-vinyl aromatic compound polymer was prepared by polymerising vinyl toluene in the presence of 2% by weight of divinyl benzene. This polymer was incorporated in half its weight of a sample of pale crepe rubber by a similar process to that described in Examples 1 to 5 and portions of this product were mixed with further rubber and the same vulcanising agents as used in Examples 1 to 5. The mixtures were vulcanised at 141° C. for 18 minutes. The proportions taken and the properties of the vulcanised products are given in the following table:

| Example number | | 10 | 11 | 12 | 13 | 14 |
|---|---|---|---|---|---|---|
| Rubber | | 100 | 90 | 80 | 70 | 60 | 50 |
| Rubber/crosslinked polymer | | 0 | 10 | 20 | 30 | 40 | 50 |
| Tensile strength (lbs./sq. in.) | | 3,540 | 3,550 | 3,820 | 3,720 | 2,820 | 1,710 |
| Elongation at break (percent) | | 720 | 760 | 660 | 670 | 610 | 450 |
| Modulus at 300% | | 365 | 415 | 590 | 665 | 970 | 1,080 |
| Hardness, B.S.° | | 47 | 47 | 53 | 60 | 75 | 89 |
| Tear strength (lbs./sq. in.) | | 840 | 1,060 | 1,330 | 1,640 | 1,090 | 1,010 |

Examples 15 to 19

Similar procedures to those described in Examples 1 to 5 were carried out but the divinyl benzene present in the styrene was replaced with di-isopropenyl benzene. The properties of the vulcanised products are given in the following table:

| Example number | | 15 | 16 | 17 | 18 | 19 |
|---|---|---|---|---|---|---|
| Rubber | | 100 | 90 | 80 | 70 | 60 | 50 |
| Rubber/crosslinked polymer | | 0 | 10 | 20 | 30 | 40 | 50 |
| Tensile strength (lbs./sq. in.) | | 3,445 | 3,750 | 3,800 | 3,370 | 2,755 | 1,450 |
| Elongation at break (percent) | | 650 | 700 | 615 | 630 | 550 | 395 |
| Modulus at 300% | | 401 | 468 | 882 | 851 | 1,002 | 1,077 |
| Hardness, B.S.° | | 42 | 45 | 49 | 57 | 66 | 82 |
| Tear strength (lbs./sq. in.) | | 956 | 1,225 | 1,593 | 1,427 | 969 | 792 |

Examples 20 to 24

Similar procedures to those described in Examples 1 to 5 were carried out but the divinyl benzene present in the styrene was replaced with an equal weight of ethylene glycol dimethacrylate. The properties of the vulcanised products are given in the following table:

| Example number | | 20 | 21 | 22 | 23 | 24 |
|---|---|---|---|---|---|---|
| Rubber | | 100 | 90 | 80 | 70 | 60 | 50 |
| Rubber/crosslinked polymer | | 0 | 10 | 20 | 30 | 40 | 50 |
| Tensile strength (lbs./sq. in.) | | 3,665 | 3,680 | 3,795 | 3,175 | 2,050 | 1,320 |
| Elongation at break (percent) | | 725 | 700 | 695 | 640 | 560 | 485 |
| Modulus at 300% | | 263 | 355 | 427 | 600 | 725 | 776 |
| Hardness, B.S.° | | 45 | 48 | 50 | 54 | 62 | 78 |
| Tear strength (lbs./sq. in.) | | 847 | 867 | 1,110 | 977 | 880 | 537 |

I claim:

A process for the production of a vulcanized rubber-like composition which comprises mixing a cross-linked polymer of a mono-vinyl aromatic compound with natural rubber at about 150° C., to form a homogeneous reinforcing product containing 1 part by weight of rubber and 1 to 3 parts by weight of the cross-linked polymer, mixing said product with more rubber and vulcanising agents and then vulcanising the mixture, said cross-linked polymer of a mono-vinyl aromatic compound being obtained by copolymerising the mono-vinyl aromatic compound with a minor proportion in the range of 1 to 5% of a cross-linking agent containing at least two and not more than three unconjugated polymerisable ethylenic double bonds in its monomeric molecular structure and said mono-vinyl aromatic compound being selected from the group consisting of styrene and the homologues thereof obtained by substituting a nuclear hydrogen atom of styrene with an alkyl group containing not more than four carbon atoms.

References Cited in the file of this patent

UNITED STATES PATENTS

| | | |
|---|---|---|
| 2,059,055 | Studt | Oct. 27, 1936 |
| 2,138,895 | Gaylor | Dec. 6, 1938 |
| 2,418,978 | Mertens | Apr. 15, 1947 |
| 2,609,353 | Rubens et al. | Sept. 2, 1952 |

OTHER REFERENCES

Boundy-Boyer: "Styrene" (1952), Reinhold (New York), page 729, lines 4–8.

McMillan: Abstract of application Serial No. 715,138, published March 6, 1951, in 644 O.G. 305.